(12) United States Patent
Neale

(10) Patent No.: US 6,786,693 B1
(45) Date of Patent: Sep. 7, 2004

(54) HITCH-MOUNTED CYCLE RACK

(76) Inventor: Nathan M. Neale, 89786 Seales Rd., Warrenton, OR (US) 97146

(*) Notice: Subject to any disclaimer, the term of this patent is extended or adjusted under 35 U.S.C. 154(b) by 0 days.

(21) Appl. No.: 10/358,612

(22) Filed: Feb. 5, 2003

(51) Int. Cl.[7] .............................. B60P 1/04; B62B 1/00; B65F 3/26
(52) U.S. Cl. ...................................... 414/462; 414/471
(58) Field of Search ................ 414/462, 467, 414/471; 224/495, 582, 503, 504, 506

(56) References Cited

U.S. PATENT DOCUMENTS

| | | | |
|---|---|---|---|
| 3,720,333 A | 3/1973 | Vaughn ...................... 214/450 |
| 3,912,098 A | 10/1975 | Nicotra ....................... 214/450 |
| 4,275,981 A | 6/1981 | Bruhn ......................... 414/462 |
| 4,646,952 A | 3/1987 | Timmers .................. 224/42.07 |
| 4,823,997 A | 4/1989 | Krieger .................... 224/42.03 |
| 5,456,564 A | 10/1995 | Bianchini ................... 414/462 |
| 5,462,398 A | 10/1995 | Hymer ....................... 414/462 |
| 5,492,454 A | * 2/1996 | Colyer ....................... 414/462 |
| 5,542,811 A | * 8/1996 | Vartanian ................... 414/541 |
| 5,647,719 A | 7/1997 | Bowlen ...................... 414/462 |
| 5,680,976 A | * 10/1997 | Koliopoulos et al. ....... 414/462 |
| 5,699,985 A | 12/1997 | Vogel ......................... 224/564 |
| D393,241 S | 4/1998 | Diotte ........................ D12/408 |
| 5,823,278 A | * 10/1998 | Geringer ..................... 177/144 |
| 5,839,875 A | 11/1998 | Miller et al. ................ 414/462 |
| 5,857,824 A | 1/1999 | De Aquiar .................. 414/462 |
| 5,899,655 A | 5/1999 | Miller et al. ................ 414/462 |
| 6,123,498 A | * 9/2000 | Surkin ........................ 414/462 |
| 6,352,401 B1 | 3/2002 | LeMay ....................... 414/463 |

* cited by examiner

Primary Examiner—Gene O. Crawford
(74) Attorney, Agent, or Firm—Law Office of Timothy E. Siegel; Timothy E. Siegel

(57) ABSTRACT

A hitch mounted cycle rack that includes a mounting bar, adapted to be fitted into a receptive motor vehicle hitch and a horizontal support member, supported by the mounting bar and being substantially perpendicular to the mounting bar and substantially horizontal when the mounting bar is fitted into a receptive motor vehicle hitch. A substantially vertical hinge is supported on the horizontal support member, at a position displaced laterally from the mounting bar by about 0.8 meters. A cycle support assembly is mounted on the horizontal support member by way of the substantially vertical hinge. Accordingly, when the hitch mounted cycle rack is mounted on the rear of an automobile, the hinge permits the cycle support assembly to be swung away from the rear of the automobile, exposing it and permitting access to it.

3 Claims, 3 Drawing Sheets

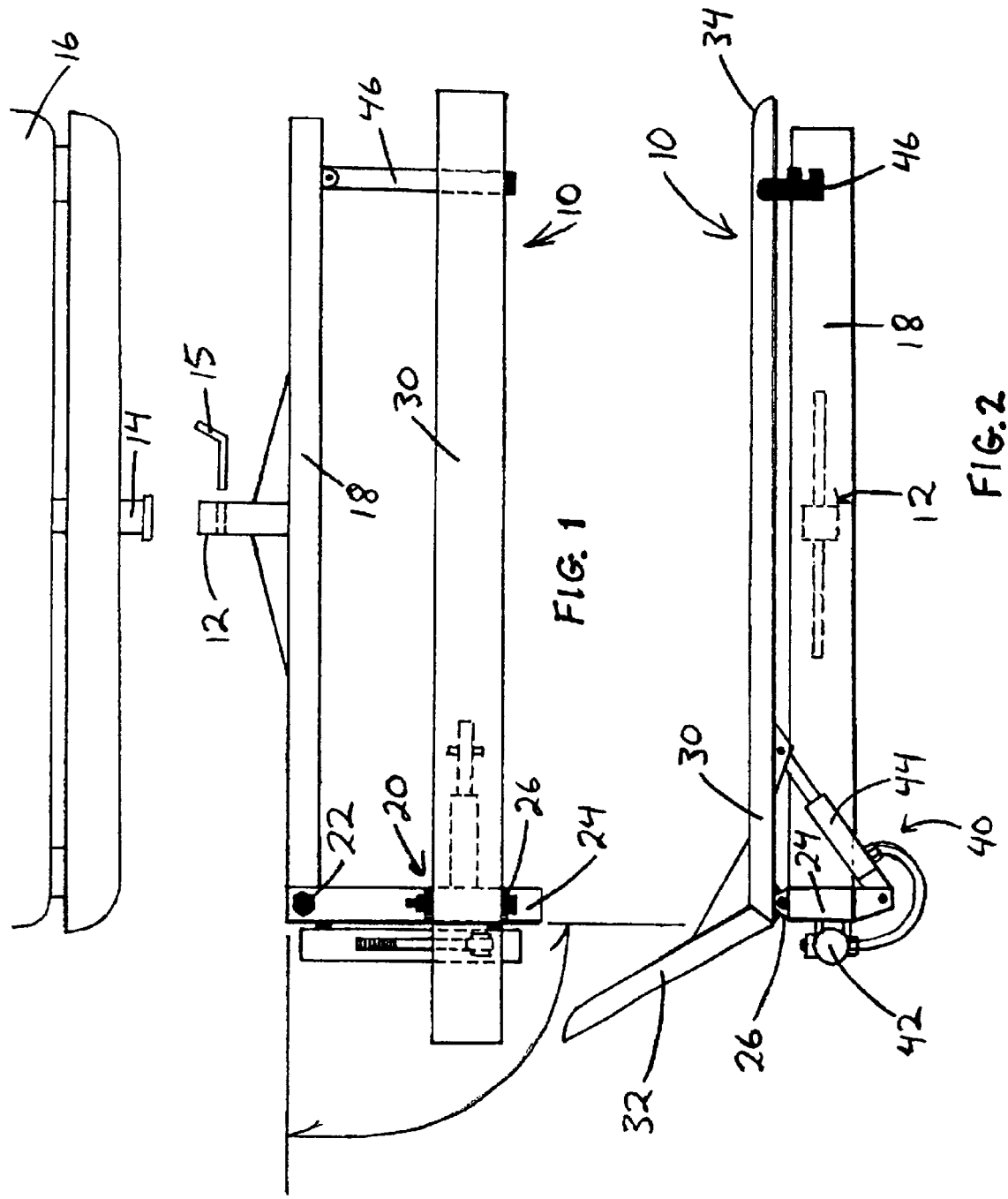

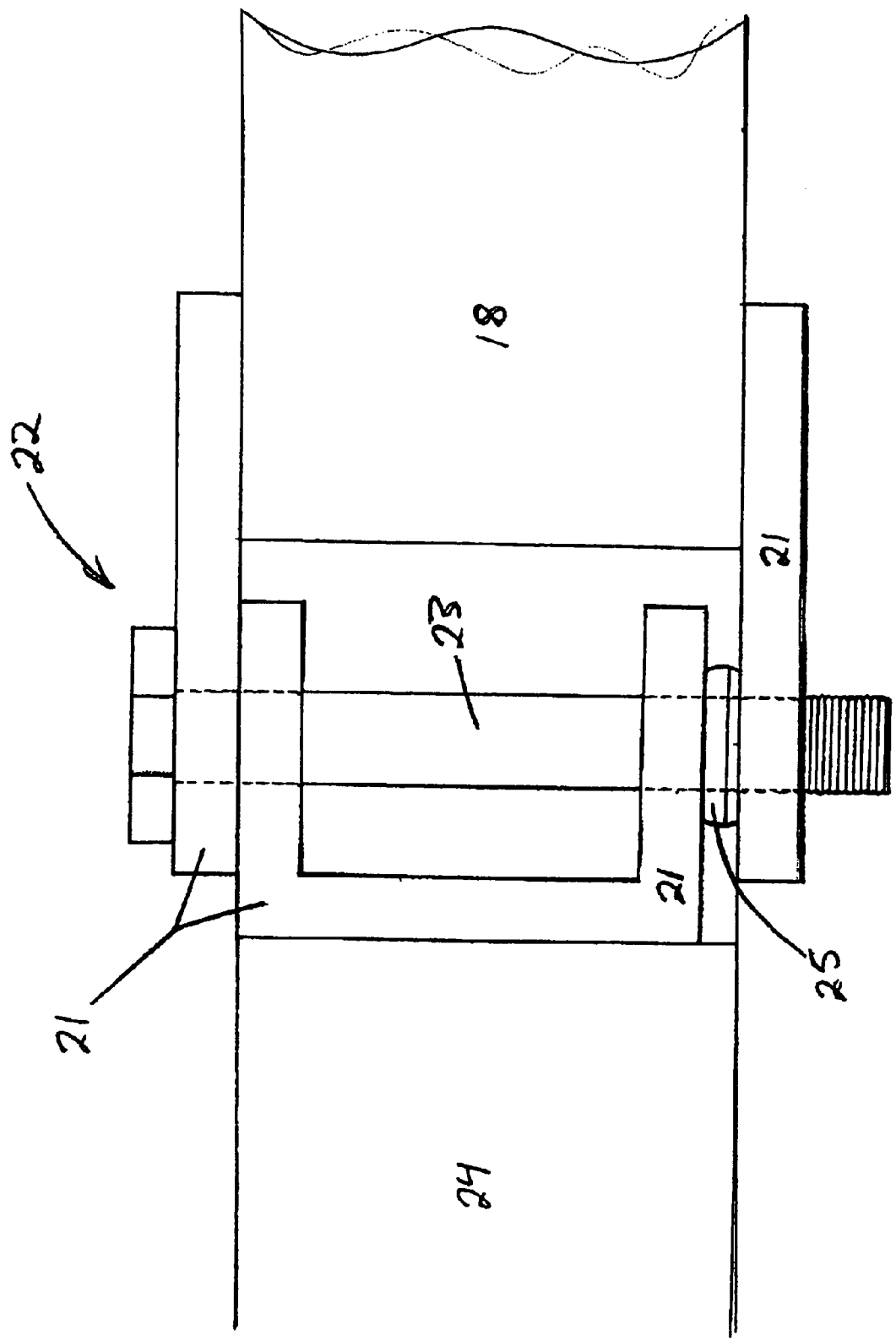

HITCH-MOUNTED CYCLE RACK

BACKGROUND OF THE INVENTION

When a motorcycle enthusiast or a bicycling enthusiast decides to enjoy a cycle ride in an area away from home, it is typical to mount the cycle onto an automobile by way of a rack. Early racks were typically mounted onto the bumpers and body of an automobile, whereas more recently designed racks are typically built to be mounted onto a Class 3 hitch, which is an increasingly common fixture included on new cars and sports/utility vehicles (SUVs).

Although a number of racks are known in the industry, many of these racks suffer from one or more shortcomings. Typically after the cycle is mounted onto an automobile by way of rack, the backside of the automobile, including a rear door in the case of a station wagon or SUV, is inaccessible as it is blocked by the cycle and rack. Accordingly, it would be desirable to have a hitch mounted cycle rack that could be quickly repositioned or reconfigured to permit access to the rear door of a station wagon or SUV.

Another shortcoming of existing cycle racks is particular to the stowing of motorcycles, which may weigh in excess of 800 lbs. Although many available racks offer a mechanism for aiding the user in lifting the motorcycle to a stowing position, many of these mechanisms are somewhat cumbersome and time-consuming to operate. Consequently, a simple and fast operating mechanism for lifting a motorcycle to a stowed position on a cycle rack would be desirable.

SUMMARY

In a first separate embodiment, the present invention is a hitch mounted cycle rack that includes a mounting bar, adapted to be fitted into a receptive motor vehicle hitch and a horizontal support member, supported by the mounting bar and being substantially perpendicular to the mounting bar and substantially horizontal when the mounting bar is fitted into a receptive motor vehicle hitch. A substantially vertical hinge is supported on the horizontal support member, at a position displaced laterally from the mounting bar by about 0.8 meters. A cycle support assembly is mounted on the horizontal support member by way of the substantially vertical hinge. Accordingly, when the hitch mounted cycle rack is mounted on the rear of an automobile, the hinge permits the cycle support assembly to be swung away from the rear of the automobile, exposing it and permitting access to it.

In a second separate aspect, the present invention is a hitch mounted cycle rack that includes a mounting bar, adapted to be fitted into a receptive motor vehicle hitch. A substantially horizontal hinge is operatively supported by the mounting bar and a cycle support frame is mounted on the horizontal support member by way of the substantially horizontal hinge. The cycle support frame has a hinge end and a cycle-loading end, opposed to the hinge end. Accordingly, the mounting bar permits the hitch mounted cycle rack to be mounted on the rear of an automobile and the hinge permits the cycle support frame to be swung downwardly into a loading position so that the cycle-loading end is proximal to the earth and a cycle can be rolled upwardly onto the cycle support frame and the cycle support frame may then be swung upwardly so that the cycle-loading end is substantially level to the hinge end for stowing the cycle.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 1 is a top view of a hitch-mounted cycle rack, according to the present invention.

FIG. 2 is a side view of the hitch-mounted cycle rack of FIG. 1.

FIG. 3 is a side view of the vertical hinge of the hitch-mounted cycle rack of FIG. 1.

DETAILED DESCRIPTION OF THE PREFERRED EMBODIMENT

Figure 4:
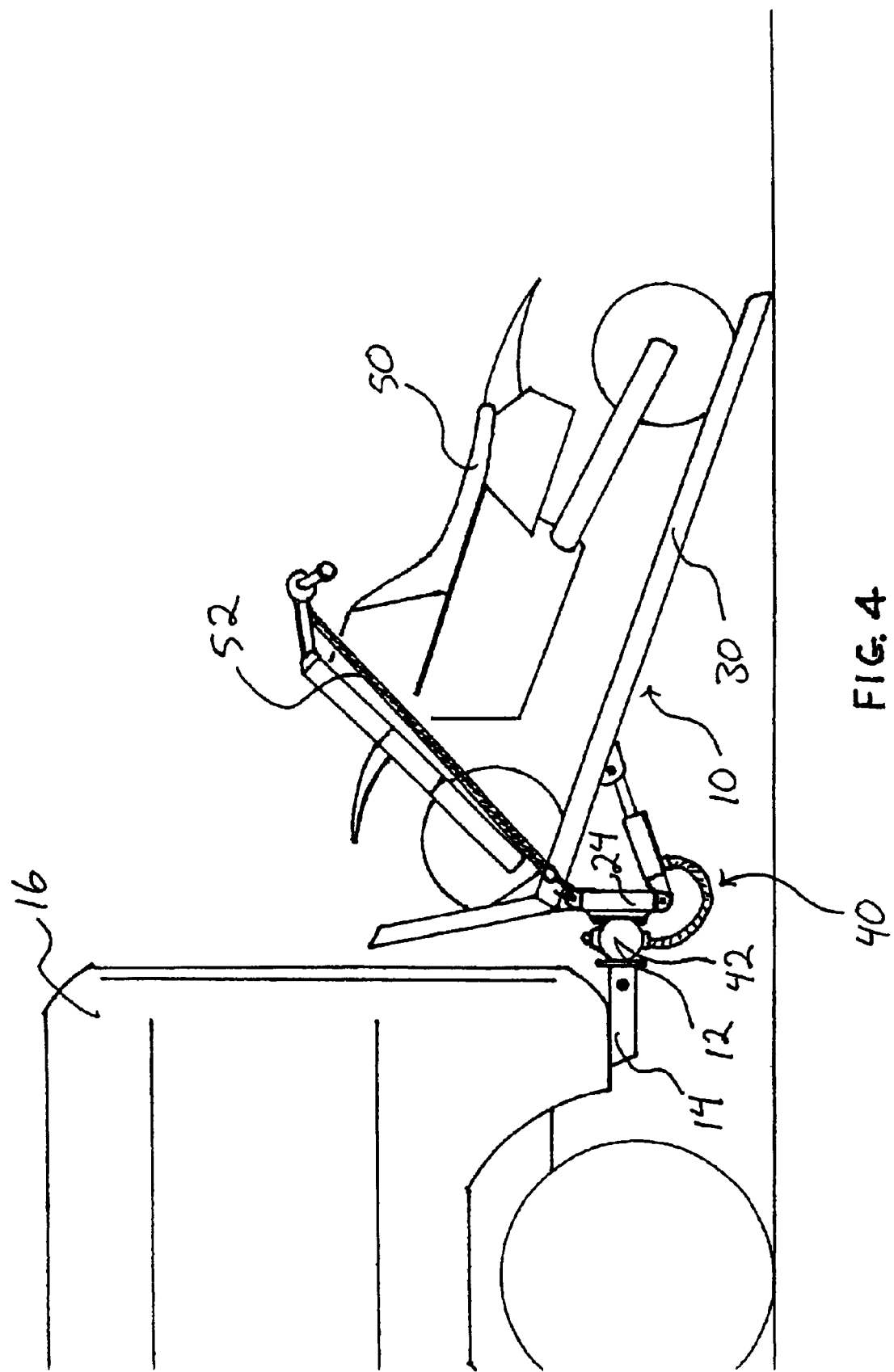
FIG. 4 is a side of the hitch-mounted cycle rack of FIG. 1, placed in loading mode and with a motorcycle being loaded onto it.

Referring to FIGS. 1 and 2, in a preferred embodiment of a hitch mounted cycle rack 10, a mounting bar 12 is adapted to be inserted into a class-3 hitch 14 of a motor vehicle 16, and locked in place by a key 15. When installed, mounting bar 12 supports a horizontal support member 18. In turn a cycle support assembly 20 is joined by a vertical hinge 22 to the left side (facing installed rack 10) of support member 18, thereby permitting assembly 20 to be swung horizontally to gain access to the rear of vehicle 16. The specific portion of the cycle support assembly 20 that is hinged to member 18 is a base 24 in the form of a 5 mm (2 inch) by 10 mm (4 inch) tube. Referring to FIG. 3, hinge 22 is formed of a set of mating 13 mm (0.5 inch) plates 21 attached respectively to member 18 and base 24. A bolt 23 links together plates 21 and a bearing 25 facilitates the action of hinge 22. In an alternative embodiment bearing 25 is omitted, as it may not be necessary. Unless noted otherwise, the various elements of rack 10 are made of 4.7 mm (3/16 inch) thick steel plate.

In turn, base 24 supports a horizontal hinge 26, which joins a cycle support frame 30 to base 24. Frame 30, which defines a hinge end 32 and a cycle-loading end 34, may be swung downwardly about hinge 26, so that cycle-loading end 34 abuts the ground, for easy loading of a cycle. A hydraulic actuator 40 may be used to swing frame 30 upwardly, to move a cycle into a stowed position, ready to be hauled by vehicle 16.

In one preferred embodiment actuator 40 is the combination of two items. The first is a hydraulic foot pump 42 available as part # 144990 from Northern Industrial Tool and Equipment, which maintains a website with the web address, www.northerntool.com. This is mated with a two-ton hydraulic cylinder 44, available as part # 14429, also from Northern Industrial Tool and Equipment. To support the cycle-loading end 34 of frame 30, when rack 10 is in the cycle stowed position a frame support member 46 is hinged to horizontal support member 18, so that it may be swung outwardly to support end 34 when the rack 10 is in the cycle stowed position.

To install rack 10, a user may insert mounting bar 12 into hitch 14. The user may then swing frame 30 outwardly and may move cycle mounting end 34 of frame 30 downwardly, by use of hydraulic actuator 40. After rolling a motorcycle 50 upwardly onto frame 30, and securing motorcycle 50 by a restraining belt 52, frame 30 may lifted upwardly by actuator 40 and swung toward horizontal support member 18. Once there, it may be supported and retained in position by swinging out frame support member 46, and engaging frame 30 to it. If, on the way to the desired cycling spot, access to the rear of vehicle 12 is desired, frame 30 is simply disengaged from support member 18 and swung outwardly, thereby permitting access.

In the present application the term "cycle" is used to refer to any two-wheeled personal transportation device, and includes within its scope both a motorcycle and a bicycle.

In an additional preferred embodiment adapted specifically for the transportation of bicycles, rack 10 is made of lightweight materials sufficient to support a bicycle, but light enough to be easily lifted by most people. In the bicycle-carrying embodiment, hydraulic actuator 40 is not included, as it is not necessary for placing a bicycle in the stowed position.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A hitch mounted cycle rack, comprising:
   (a) a mounting-bar, adapted to be fitted into a receptive motor vehicle hitch;
   (b) a horizontal support member, supported by said mounting bar and being substantially perpendicular to said mounting bar and substantially horizontal when said mounting bar is fitted into a receptive motor vehicle hitch;
   (c) a substantially vertical hinge, supported by said horizontal support member at a position displaced laterally from said mounting bar, by about 0.8 meters;
   (d) a cycle support assembly mounted on said horizontal support member by way of said substantially vertical hinge, and including:
      (i) a substantially horizontal hinge; and
      (ii) a cycle support frame supported by said substantially horizontal hinge and defining a hinge end, coincident to said substantially horizontal hinge, and a cycle-loading end, opposed to said hinge-end; and
      (iii) wherein said hinge permits said cycle support frame to be swung downwardly into a loading position so that said cycle-loading end is proximal to the earth and a cycle can be rolled upwardly onto said cycle support frame and further wherein said cycle support frame may be swung upwardly so that said cycle-loading end is substantially level to said hinge end for transporting said cycle.; and
   (e) whereby said mounting bar permits said hitch mounted cycle rack to be mounted on the rear of an automobile and said hinge permits said cycle support assembly to be swung away from said rear of said automobile, exposing it and permitting access to it.

2. The hitch mounted cycle rack of claim 1, further comprising a hydraulic actuator adapted to rotate said cycle support frame about said substantially horizontal hinge.

3. The hitch mounted cycle rack of claim 2 wherein said hydraulic actuator is manually driven.

* * * * *

UNITED STATES PATENT AND TRADEMARK OFFICE
CERTIFICATE OF CORRECTION

PATENT NO.    : 6,786,693 B1
DATED         : September 7, 2004
INVENTOR(S)   : Nathan M. Neale It is certified that error appears in the above-identified patent and that said Letters Patent is hereby corrected as shown below:

Column 3,
Line 23, please change "mounting-bar" to -- mounting bar --

Signed and Sealed this

Fourth Day of January, 2005

JON W. DUDAS
*Director of the United States Patent and Trademark Office*